(12) United States Patent  (10) Patent No.: US 9,033,144 B2
Wrenn  (45) Date of Patent: May 19, 2015

(54) FOLDABLE PACKAGING FOR FLAT MEDIA

(71) Applicant: Courtney Wrenn, Brooklyn, NY (US)

(72) Inventor: Courtney Wrenn, Brooklyn, NY (US)

( * ) Notice: Subject to any disclaimer, the term of this patent is extended or adjusted under 35 U.S.C. 154(b) by 7 days.

(21) Appl. No.: 13/869,357

(22) Filed: Apr. 24, 2013

(65) Prior Publication Data

US 2013/0306502 A1 Nov. 21, 2013

Related U.S. Application Data

(60) Provisional application No. 61/648,255, filed on May 17, 2012.

(51) Int. Cl.
*G11B 33/04* (2006.01)
*G09F 1/00* (2006.01)
*G09F 1/06* (2006.01)

(52) U.S. Cl.
CPC .............. *G11B 33/0494* (2013.01); *G09F 1/00* (2013.01); *G09F 1/06* (2013.01)

(58) Field of Classification Search
USPC ......... 206/308.1–313; 229/108, 116.1, 116.5; 211/40
See application file for complete search history.

(56) References Cited

U.S. PATENT DOCUMENTS

| | | | | |
|---|---|---|---|---|
| 2,747,787 | A * | 5/1956 | Davidson, Jr. ................. | 206/309 |
| 3,853,741 | A * | 12/1974 | Klupt ........................ | 229/120.01 |
| 4,709,812 | A | 12/1987 | Kosterka | |
| 5,307,927 | A | 5/1994 | Curtis et al. | |
| 5,333,728 | A * | 8/1994 | O'Brien et al. ................. | 206/312 |
| 5,450,953 | A | 9/1995 | Reisman | |
| 5,460,265 | A * | 10/1995 | Kiolbasa ..................... | 206/308.1 |
| 5,613,612 | A | 3/1997 | Davault | |
| 5,662,218 | A | 9/1997 | Ladwig | |
| 5,697,496 | A | 12/1997 | Bauer | |
| 5,769,217 | A * | 6/1998 | Derraugh et al. .......... | 206/308.1 |
| 5,839,652 | A | 11/1998 | Ben-Haim | |
| 5,857,565 | A * | 1/1999 | Baker et al. ..................... | 206/232 |
| 6,164,445 | A | 12/2000 | Cooper | |
| 7,703,604 | B2 * | 4/2010 | Golden et al. ................. | 206/312 |
| 8,104,613 | B2 * | 1/2012 | Trammell ..................... | 206/310 |
| 2008/0105573 | A1 * | 5/2008 | Gonzales ................... | 206/308.1 |
| 2009/0020595 | A1 * | 1/2009 | Krogh et al. ................ | 229/116.5 |

FOREIGN PATENT DOCUMENTS

| | | | |
|---|---|---|---|
| CN | 2425866 | 4/2001 | |
| CN | 2897121 | 5/2007 | |
| CN | 201245263 | 5/2009 | |
| FR | 2678583 | 1/1993 | |
| FR | 2770207 | 4/1999 | |
| WO | WO9321086 | * 10/1993 | ............. B65D 85/57 |

OTHER PUBLICATIONS

"Cube", http://gwydir.demon.co.uk/jo/solid/cube.htm (2007).

* cited by examiner

*Primary Examiner* — Bryon Gehman
(74) *Attorney, Agent, or Firm* — Fitzpatrick, Cella, Harper & Scinto

(57) ABSTRACT

A novel packaging for flat media having substantially square panels wherein at least one of the panels is adapted to form a compartment for storing a phonographic record, an audiovisual record or any flat media. The arrangement of the square panels enables the package to be folded in a compact, flat configuration for ease of storage and shipping. When erected, the package forms a cube that could be used as additional storage. The cube may be erected with either of the sides of the panels visible so as to afford greater opportunity for display.

28 Claims, 5 Drawing Sheets

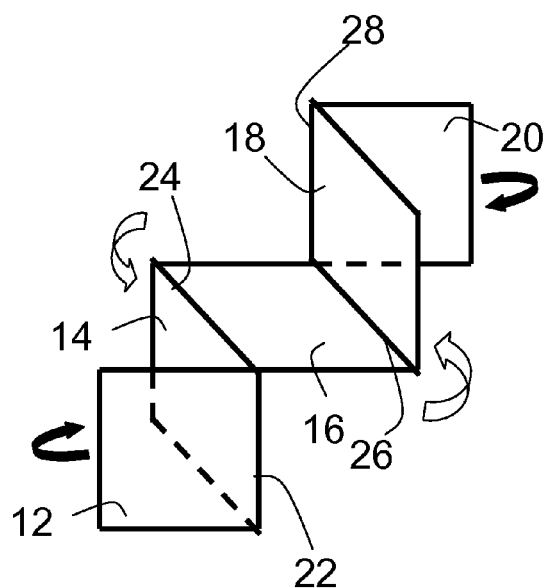
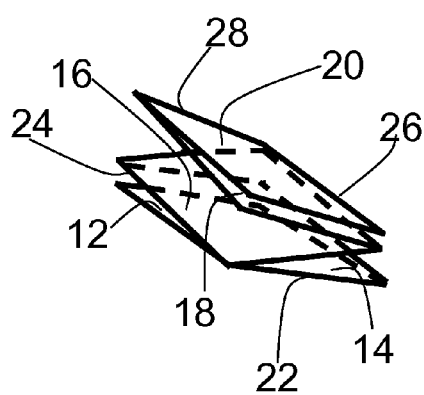
Figure 3
Figure 4
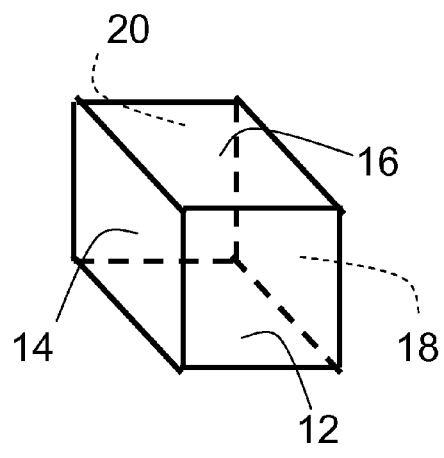
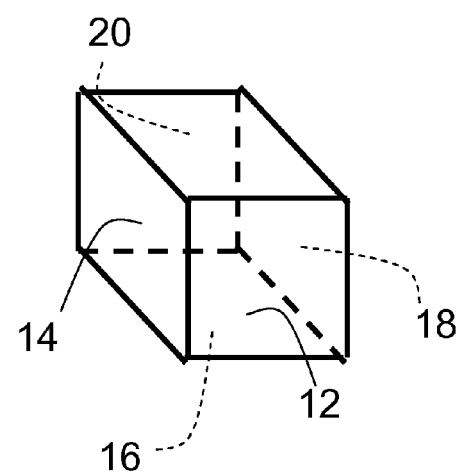
Figure 5
Figure 6

FOLDABLE PACKAGING FOR FLAT MEDIA

BACKGROUND OF THE INVENTION

1. Field of the Invention

The present invention relates generally to a multi panel package for storing and displaying flat media such as phonographic record, audiovisual record, photograph, compact disk ("CD"), digital video disk ("DVD"), Blu-ray disk and the like. More particularly, the present invention relates to a flat packaging for media that may be erected into a cube for storage or display purposes.

2. Description of Related Art

The use of paperboard structures as containers is well-known. These structures are economical to produce, simple in form, and easy to assemble.

Paperboard packages or album covers have been designed for storing flat media for some time. They have often been square, and have been designed to protect the media from the elements and scratches during handling, shipment, display and storage. It is also desirable that the media package is compact to maximize packing efficiency for shipping and storage.

The surfaces of the package or album covers are often decorated with artwork, contain printed information, and often function as advertising for the artist(s) featured in the media. These album covers are sought by collectors both for their aesthetic and historical value.

Cube constructs provided by erected or folded paperboard are also well-known. These cube constructs have the advantage of simultaneously providing up to six display surfaces, but storage for flat media has only been available within the cube container, where it is not available for display.

SUMMARY OF THE INVENTION

An object of the present invention is to provide a novel package for flat media that may be folded flat for storage or shipping, and can be erected into a cube structure for use as a storage container for items other than said flat media, as display or as decorative object.

Another object of the present invention is to provide an erectable cube structure that assembles reversibly so that either of its surfaces may be shown as exterior surfaces.

A still further object of the present invention is to provide an erectable cube structure with transparent slot to removably receive and display flat media.

Another object of the present invention is to provide an erectable cube structure bearing a spindle hub such as a DIGI-PAK® (the spindle hubs may be generically referred to as "digitray"), to removably receive and display CD's, DVD's, Blu-ray disks and the like. DIGIPAK® is the subject matter of expired U.S. Pat. No. 4,709,812, and is a registered trademark currently owned by Atlas AGI Holding, LLC.

These objects and others are provided by an improved folding media packaging. The package construction comprises multiple panels that may be folded along hinges or scorelines in various permutations, whereas at least one panel is especially constructed to receive a flat media. When erected, the construct provides a cube structure that could also function as additional storage or as a decorative item, or as display. In this manner, the package for flat media may also function as a storage cube or display item.

BRIEF DESCRIPTION OF THE DRAWINGS

FIG. 3 is a perspective view of a partially folded media package according to FIG. 2;

FIG. 4 is a perspective view of a folded media package according FIG. 3;

FIG. 5 is a perspective view of an erected cube formed from the media package of FIG. 2;

FIG. 6 is a perspective view of an alternate way to erect the cube, wherein the design previously on the interior surface of the cube erected in FIG. 5 is now displayed on the exterior surface of this alternately erected cube;

DETAILED DESCRIPTION OF THE DRAWINGS

Figure 1:
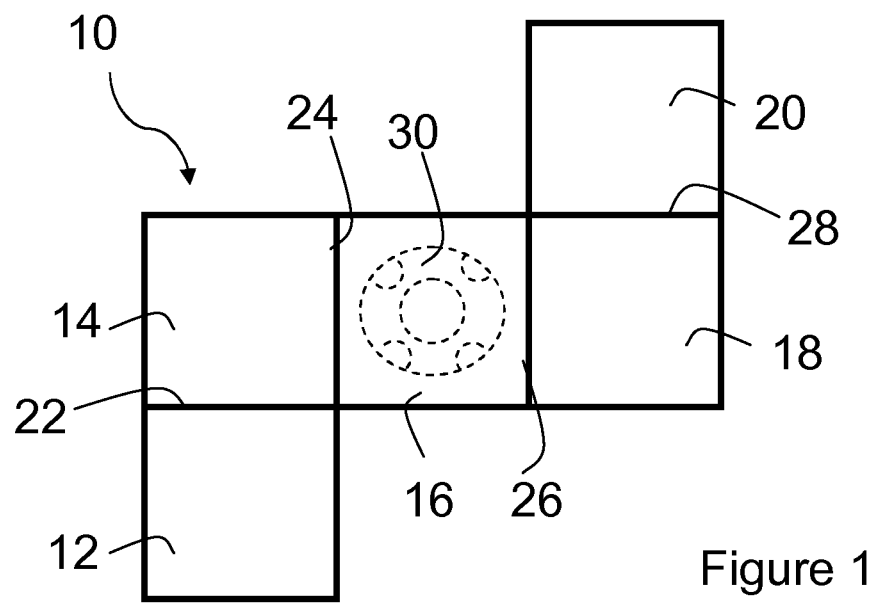
FIG. 1 is a top plan view of a five panel embodiment of the unfolded media package according to the present invention.

Reference will now be made to the accompanying drawings, to assist in describing the various features of the package of the present invention. As shown in FIG. 1, package 10 is formed from five substantially square panels 12, 14, 16, 18, 20 provided with a plurality of folding marks, hinges or score lines 22, 24, 26, 28, to better facilitate shipping, construction or assembly as explained hereinbelow.

Package 10 may be formed from paperboard blank. Alternatively, the package may be composed from other suitable materials known in the field. Such suitable materials include plastics such as polypropylene. The material elected to form the package should be sufficiently rigid to enable the package to be assembled into a cube, or offer support to the stored media during display and shipping, but exhibit sufficient malleability and pliability to be folded along score lines repeatedly without tearing.

The paperboard or elected material may have special coating to the surface to enhance durability, or to enable printing on the surface. Alternately, the paperboard or elected material could be laminated or embossed, etc., on one or more surfaces for protection or to incorporate additional design elements, such as a hologram or the like.

At least one of the panels 12, 14, 16, 18, 20 is specially adapted to hold a flat media. In the embodiment illustrated in FIG. 1 panel 16 provides a molded spindle hub or a CD digitray for receiving a CD, DVD, or Blu-ray disk, etc.

Figure 2:
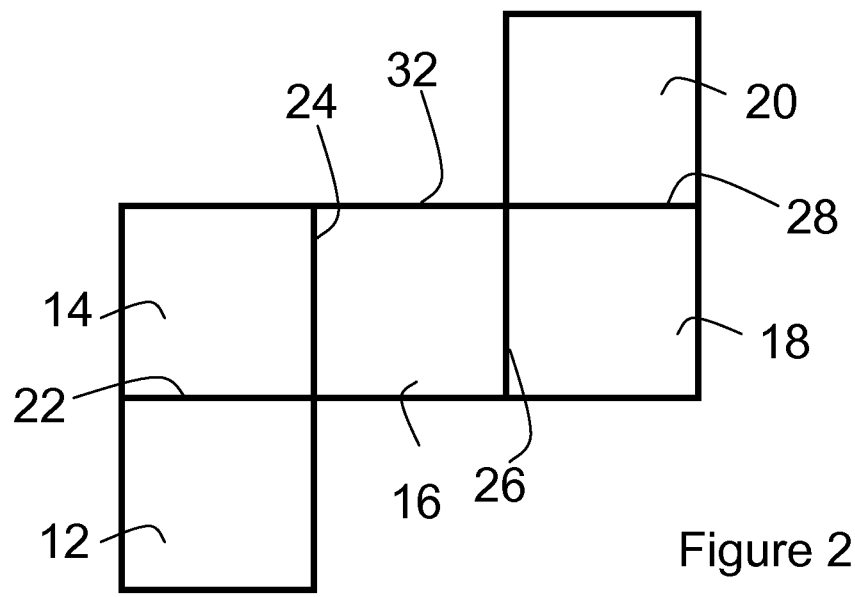
FIG. 2 is a top plan view of an alternative embodiment of the unfolded media package of FIG. 1.

Alternatively, at least one of the panels 12, 14, 16, 18, 20 may be formed by a two ply material, and so provides a pouch (unillustrated) having at least one open edge 32 for receiving the flat media such as a record, or photograph and or the like, herein as shown in FIG. 2. In that embodiment, panel 16 containing open edge 32 may be formed from transparent or translucent materials so as to better display the flat media as desired. As would be understood by others skilled in the art, the dimensions of the square panels will vary depending on the type of media for which the package is designed to store.

To fold package 10 to form a flattened construct with less surface area for ease of storage and shipping, panels 14 and 18 are folded in opposite directions below and above the plane of panel 16 as shown in FIG. 3. The two remaining panels 12 and 20 are then folded backwards and forward, respectively, to form a compact package condensed to a footprint the size of panel 16 as shown in FIG. 4, with panels 12, 14, 16, 18, 20 stacked atop each other.

Once purchased, a customer can readily erect the package so as to form a cube. The cube could be used both for storage and as well as providing a decorative item. First, the flattened construct of FIG. 3 is completely unfolded as shown in FIG. 1. Thereafter, panels 14 and 18 are folded below the plan of panel 16, while the remaining panels are folded sideways to complete the remaining walls of the cube, as shown in FIG. 5. The erected cube could be held in place using removable stickers shipped with the media package. Alternately the walls could also be releasably secured using tab and slot closure as readily understood by one skilled in the art.

One advantage of the present invention is that panels 14 and 18 may alternately be folded above the plan of panel 16, while the remaining panels are folded sideways to complete remaining walls of the cube as shown in FIG. 6. In this second alternate configuration, the design previously on the interior surface of the cube erected in FIG. 5 is now displayed on the exterior surface of this alternately erected cube.

Figure 7:
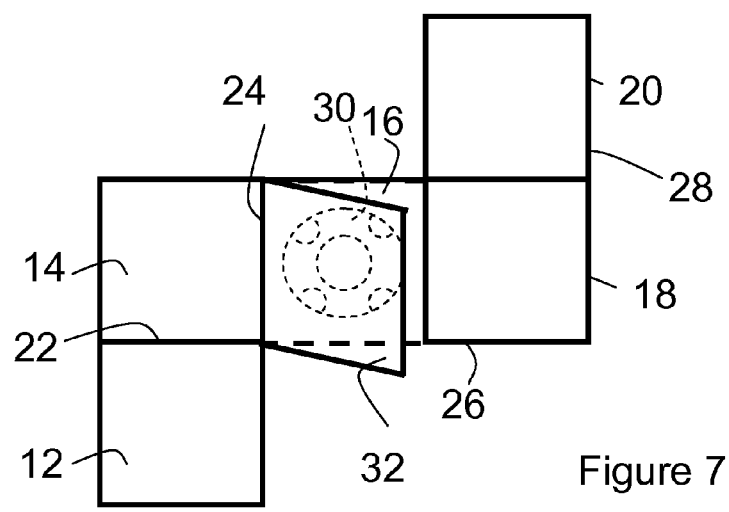
FIG. 7 is a perspective view of another alternate embodiment of the media package according to FIG. 1.

It may be desirable to provide a further panel 32 affixed to the front of panel 16, as shown in FIG. 7. Thus, panel 32 forms a reclosable cover that can be releasably secured using a tab and slot closure, a string and button closure, a hook and loop fastener, or any other releasable closures or fasteners known in the field. As can be appreciated, panel 32 now forms a reclosable cover to protect any CD stored on the hub or digitray affixed to panel 16.

Figure 8:
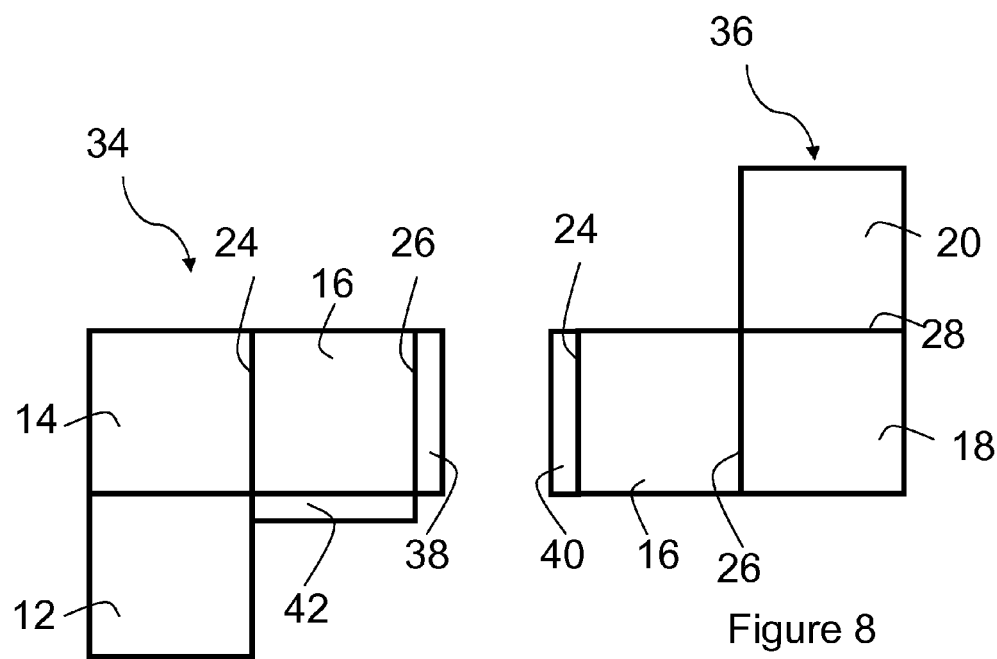
FIG. 8 is a top plan view of two blanks that may be assembled to form the media package of FIG. 2.

The media package 10 of FIG. 2 providing two-ply media-receiving slot 32 may be constructed as shown in FIG. 8 by providing blanks 34 and 36. Each blank comprises a L-shaped three square panels, and lateral flaps 38, 40 and bottom flap 42. Adhesive is applied to the front surface of flap 38 which is affixed to the front of panel 16 along fold line 26. Similarly, adhesive on the back of flap 40 is used for adhesion along fold line 24. Thus, panel 16 is formed from the superimposition of two panels to create a two-ply sleeve, and bottom flap 42 is adhered along the bottom edge of panel 16 to form the bottom wall of a pocket to receive and store the flat media.

Figure 9:
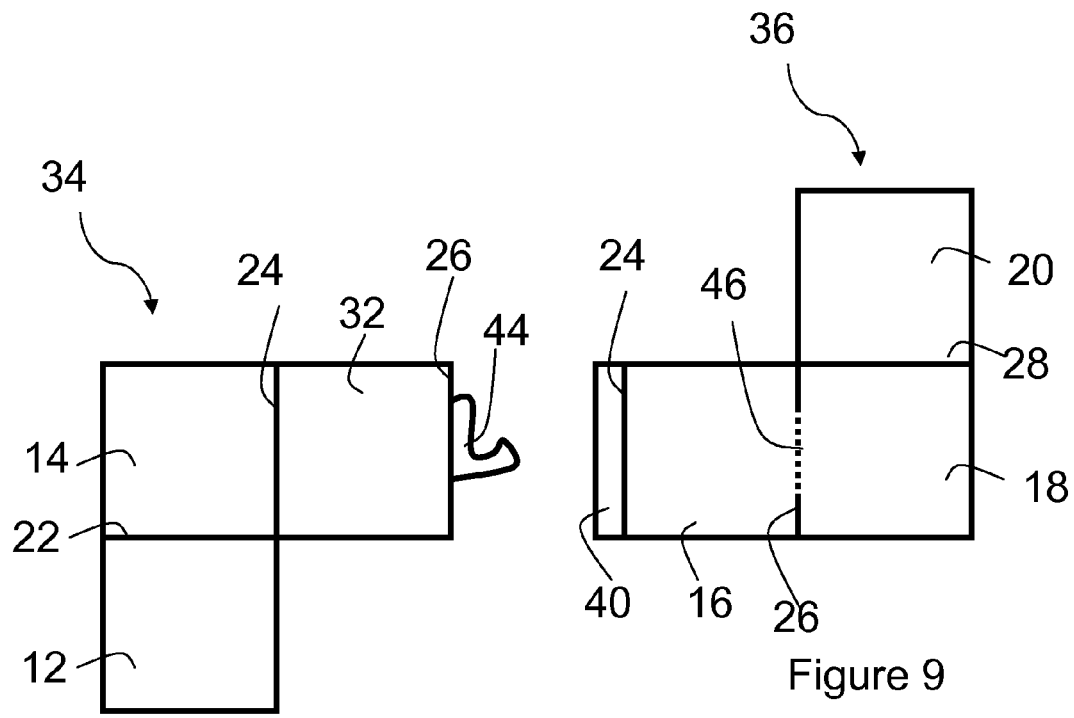
FIG. 9 is a top plan view of an alternative embodiment of the two blanks of FIG. 8.

Yet another embodiment illustrated in FIG. 9 is a two ply middle panel wherein the flap extending from panel 16 is a tab 44 that may be tucked into a slot 46 cut along fold line 26.

Figure 10:
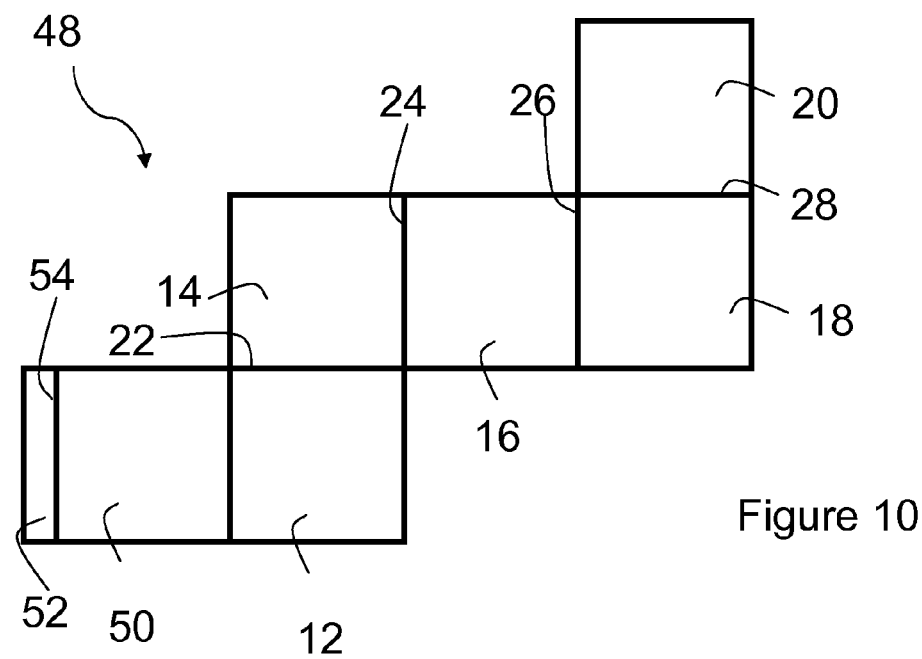
FIG. 10 is a top plan view of a six panel embodiment 48 of the unfolded media package according to the present invention.

In another embodiment, the package could be formed from a six paneled template 48 as shown in FIG. 10, wherein panel 50 forms a lid for the cube when the package is erected. An optional tab 52 folded along line scoreline 54 may be included to enable the lid formed by panel 50 to be tucked into the body of the erected cube.

Figure 11:
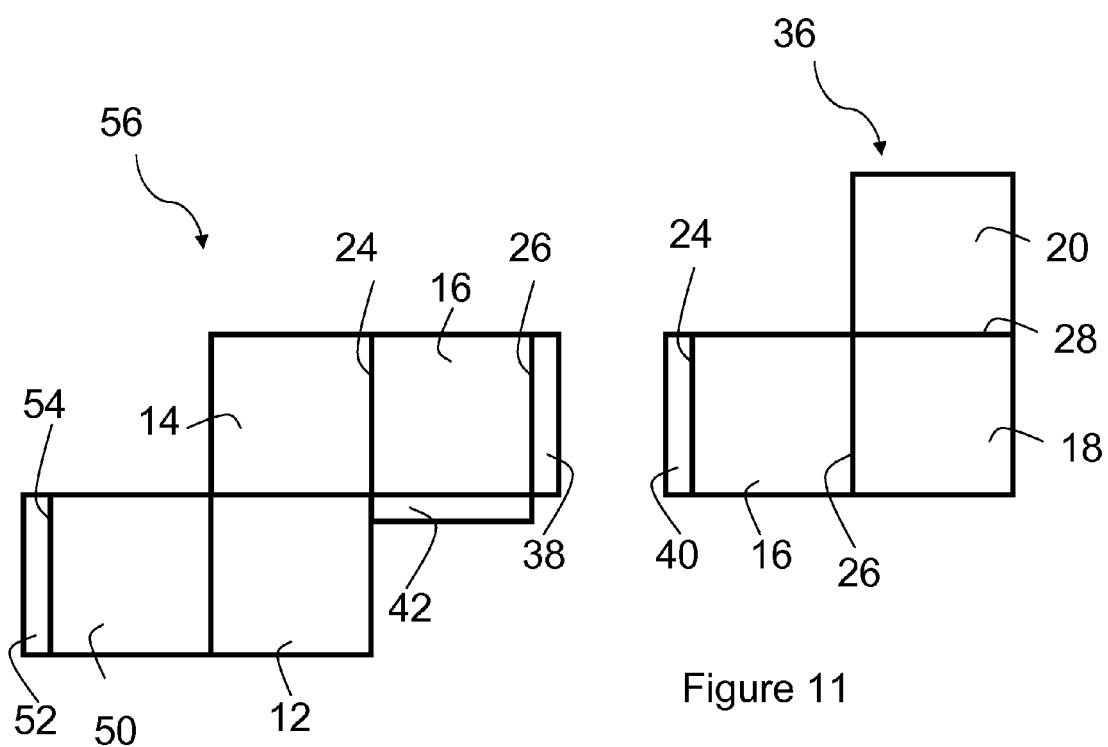
FIG. 11 is a top plan view of two blanks that may be assembled to form the media package of FIG. 9.

As before, to provide a media-receiving slot, the six paneled template 48 may be constructed from one L-shaped three-panel blank 36 and a four-panel blank 56 as shown in FIG. 11.

The embodiment described is intended to explain modes known of practicing the invention and to enable others to utilize the invention in such, or other embodiments and with various modifications required by the particular applications or uses of the packaging design.

The description is not intended to limit the invention to the form disclosed. It should be understood that various modifications can be made to the preferred embodiments disclosed herein without departing from the scope of the invention or without loss of its advantages. Thus, variations and modifications applying the principles described herein are intended to fall within the scope of the invention.

What is claimed is:

1. A media package for storage, comprising:
   a row of panels connected along folding lines, said row of panels comprising a first outer panel and a second outer panel, the first and second panels being separated by a third inner panel;
   a fourth panel connected along a folding line to an upper edge of said first outer panel; and
   a fifth panel connected along a folding line to a lower edge of the second outer panel,
   wherein
   all of said panels are substantially square and of substantially the same size so said package may be assembled into a five-sided cube by folding said panels along said folding lines,
   at least one of said panels being a media-retaining panel that comprises a means to engage and fixedly retain at least one flat media, and
   when the media package is folded in a square, compact, flat configuration, the folded media package comprises five stacked panels, and is structured to be opened from right to left along the folding line between the first panel and the fourth panel to reveal a surface of the first panel and a surface of the fourth panel; then closed, rotated 90°, and reopened from right to left along the folding line between the first panel and the third panel to reveal a surface of the first panel and a surface of the third panel; then closed, rotated 90°, and reopened from right to left along the folding line between the second panel and the fifth panel to reveal a surface of the second panel and a surface of the fifth panel; and
   then closed, rotated 90°, and reopened from right to left along a folding line between the second panel and the third panel to reveal a surface of the second panel and a surface of the third panel.

2. The media package of claim 1, wherein said panels are single ply.

3. The package of claim 2, wherein said media-retaining panel comprises the retaining means as a digitray.

4. The media package of claim 1, wherein said media-retaining panel is two-ply and provides the retaining means as a media-retaining slot.

5. The media package of claim 4, wherein said panels other than the media retaining panel are single ply.

6. The media package of claim 5, wherein said media-retaining panel provides a cut-out on at least one of said plies for displaying a flat media contained within the media-retaining panel.

7. The media package of claim 6, wherein said media-retaining panel comprises a transparent or translucent panel provided on said cut-out, wherein the transparent or translucent panel protects flat media contained therein.

8. The media package of claim 5, wherein said media-retaining panel provides cut-outs on both of said plies for displaying a flat media contained therein.

9. The media package of claim 8, wherein said media-retaining panel comprises transparent or translucent panels provided on said cut-out, wherein the transparent or translucent panels protect flat media contained therein.

10. The media package of claim 4, comprising a flat media contained in said media-retaining slot.

11. The media package of claim 3, comprising a hinged panel to cover flat media affixed to said digitray.

12. The media package of claim 11, wherein said hinged panel provides a cut-out to display flat media affixed to said digitray.

13. The media package of claim 12, wherein said hinged panel comprises a transparent or translucent panel provided on said cut-out to protect flat media contained therein.

14. The media package of claim 3, comprising a flat media retained in said digitray.

15. A media package storage comprising:
- a row of panels connected along folding lines, said row of panels comprising a first outer panel and a second outer panel, the first and second panels being separated by a third inner panel;
- a fourth panel connected along a folding line to an upper edge of said first outer panel;
- a fifth panel connected along a folding line to a lower edge of the second outer panel; and
- a sixth panel connected along a folding line to an outer edge of the fifth panel, wherein
- all of said panels are substantially square and of substantially the same size so said package may be assembled into a six-sided cube by folding said panels along said folding lines, and
- at least one of said panels being a media-retaining panel that comprises a means to engage and fixedly retain at least one flat media, and
- when the media package is folded in a square, compact, flat configuration, the folded media package comprises six stacked panels, and is structured to be opened from right to left along the folding line between the first panel and the fourth panel to reveal a surface of the first panel and a surface of the fourth panel; then closed, rotated 90°, and reopened from right to left along the folding line between the first panel and the third panel to reveal a surface of the first panel and a surface of the third panel; then closed, rotated 90°, and reopened from right to left along the folding line between the second panel and the fifth panel to reveal a surface of the second panel and a surface of the fifth panel; and then closed, rotated 90°, and reopened from right to left along a folding line between the second panel and the third panel to reveal a surface of the second panel and a surface of the third panel.

16. The media package of claim 13, wherein said panels are single ply.

17. The package of claim 16, wherein said media-retaining panel comprises the retaining means as a digitray.

18. The media package of claim 13, wherein said media-retaining panel is two-ply and provides the retaining means as a media-retaining slot.

19. The media package of claim 18, wherein said panels other than the media retaining panel are single ply.

20. The media package of claim 19, wherein said media-retaining panel provides a cut out on at least one of said plies for displaying a flat media contained within the media-retaining panel.

21. The media package of claim 20, wherein said media-retaining panel comprises a transparent or translucent panel provided on said cut-out to protect flat media contained therein.

22. The media package of claim 18, wherein said media-retaining panel provides cut-outs on both of said plies for displaying a flat media contained therein.

23. The media package of claim 22, wherein said media-retaining panel comprises transparent or translucent panels provided on said cut-out to protect flat media contained therein.

24. The media package of claim 15, comprising a hinged panel to cover flat media affixed to said digitray.

25. The media package of claim 18, comprising a flat media contained in said media-retaining slot.

26. The media package of claim 24, wherein said hinged panel provides a cut-out to display flat media affixed to said digitray.

27. The media package of claim 26, wherein said media-retaining panel comprises a transparent or translucent panel provided on said cut-out to protect flat media contained therein.

28. The media package of claim 15, comprising a flat media retained in said digitray.

* * * * *

UNITED STATES PATENT AND TRADEMARK OFFICE
CERTIFICATE OF CORRECTION

PATENT NO. : 9,033,144 B2
APPLICATION NO. : 13/869357
DATED : May 19, 2015
INVENTOR(S) : Courtney Wrenn Page 1 of 1

It is certified that error appears in the above-identified patent and that said Letters Patent is hereby corrected as shown below:

ON TITLE PAGE AT (56) FOREIGN PATENT DOCUMENTS:

"WO   WO9321086 * 10/1993" should read --WO   WO93/21086 * 10/1993--.

IN THE SPECIFICATION

COLUMN 3:

Line 33, "a" should read --an--;
Line 47, "six paneled" should read --six-paneled--; and
Line 52, "six pan-" should read --six-pan- --.

IN THE CLAIMS

COLUMN 6:

Line 1, "claim 13," should read --claim 15,--;
Line 5, "claim 13," should read --claim 15,--;
Line 26, "claim 15," should read --claim 17,--; and
Line 37, "claim 15," should read --claim 17,--.

Signed and Sealed this
Twenty-seventh Day of October, 2015

Michelle K. Lee
*Director of the United States Patent and Trademark Office*